(12) United States Patent
Eilinghoff et al.

(10) Patent No.: US 10,040,955 B2
(45) Date of Patent: Aug. 7, 2018

(54) METHOD FOR REMOVING SUBSTRATES PROVIDED WITH ORGANIC COATINGS

(71) Applicant: CHEMETALL GMBH, Frankfurt am Main (DE)

(72) Inventors: Ron Eilinghoff, Frankfurt (DE); Michael Schwamb, Frankfurt (DE); Daniel Wasserfallen, Mainz (DE); Vera Sotke, Schwalbach am Taunus (DE); Aliaksandr Frenkel, Offenbach (DE); Stephanie Gerold, Paderborn (DE); Wolfgang Bremser, Paderborn (DE); Martin Droll, Schlangen (DE); Oliver Seewald, Marsberg (DE); Evgenija Niesen-Warkentin, Soest (DE); Lars Schachtsiek, Paderborn (DE); Manuel Traut, Hamm (DE)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 15/115,872

(22) PCT Filed: Feb. 3, 2015

(86) PCT No.: PCT/EP2015/052203
§ 371 (c)(1),
(2) Date: Aug. 1, 2016

(87) PCT Pub. No.: WO2015/117959
PCT Pub. Date: Aug. 13, 2015

(65) Prior Publication Data
US 2017/0009088 A1    Jan. 12, 2017

(30) Foreign Application Priority Data

Feb. 4, 2014 (DE) .......................... 10 2014 201 919

(51) Int. Cl.
```
B08B 3/00      (2006.01)
C09D 9/00      (2006.01)
C23C 18/18     (2006.01)
C23G 1/14      (2006.01)
C23G 1/18      (2006.01)
C23G 1/24      (2006.01)
C23G 1/26      (2006.01)
B05D 1/02      (2006.01)
B05D 1/18      (2006.01)
```
(52) U.S. Cl.
CPC .................. *C09D 9/00* (2013.01); *B05D 1/02* (2013.01); *B05D 1/18* (2013.01); *C23C 18/1824* (2013.01); *C23G 1/14* (2013.01); *C23G 1/18* (2013.01); *C23G 1/24* (2013.01); *C23G 1/26* (2013.01)

(58) Field of Classification Search
CPC .... C09D 9/00; B05D 1/18; B05D 1/02; C23C 18/1824; C23G 1/14; C23G 1/18; C23G 1/24; C23G 1/26
See application file for complete search history.

(56) References Cited

U.S. PATENT DOCUMENTS

| | | |
|---|---|---|
| 5,064,487 A | 11/1991 | Fourne |
| 5,415,797 A | 5/1995 | Ishida |
| 5,858,106 A * | 1/1999 | Ohmi ........................ B08B 3/02 134/1 |
| 6,152,148 A * | 11/2000 | George .................. C11D 1/004 134/2 |
| 6,709,707 B2 * | 3/2004 | Knobbe .................... C09D 9/00 134/2 |
| 6,855,210 B1 * | 2/2005 | Dostie ...................... C11D 1/72 134/26 |
| 2002/0166568 A1 * | 11/2002 | Park ........................ C11D 7/06 134/1 |
| 2003/0049382 A1 | 3/2003 | Knobbe et al. |
| 2009/0084406 A1 * | 4/2009 | Lee .......................... G03F 7/425 134/18 |
| 2009/0229636 A1 * | 9/2009 | Fairbourn ................. C23F 1/08 134/18 |
| 2010/0273015 A1 | 10/2010 | Pfeiffer et al. |
| 2015/0079277 A1 | 3/2015 | Wasserfallen et al. |
| 2016/0168711 A1 * | 6/2016 | Wasserfallen ........ C09D 105/12 427/372.2 |
| 2017/0066009 A1 * | 3/2017 | Bremser ................ B05D 7/542 |

FOREIGN PATENT DOCUMENTS

| | | |
|---|---|---|
| CN | 101225522 A | 7/2008 |
| DE | 31 24 348 A1 | 4/1982 |
| DE | 10 2013 201 966 A1 | 8/2013 |
| WO | WO-2015007789 A2 * | 1/2015 ........... C09D 105/06 |

OTHER PUBLICATIONS

Search Report for SG Patent Application No. 11201606471U, Completed on Aug. 3, 2017, 4 pages.

* cited by examiner

*Primary Examiner* — Sharidan Carrillo
(74) *Attorney, Agent, or Firm* — Armstrong Teasdale LLP

(57) ABSTRACT

The invention relates to a method for removing a substrate that is coated with an organic coated coating by means of ionogenic gel formation. In said method, a wet or dry organic coating that has not yet formed a film on the substrate is treated with an aqueous solution of a metal salt from main group I in the periodic table of the elements, a complexing agent and/or a basic compound having a pH value >10.

17 Claims, No Drawings

METHOD FOR REMOVING SUBSTRATES PROVIDED WITH ORGANIC COATINGS

CROSS REFERENCE TO RELATED APPLICATIONS

This is a National Stage entry of International Patent Application PCT/EP2015/052203, filed on Feb. 3, 2015, which application claims priority from German Application No. 102014201919.2, filed Feb. 4, 2014. Each patent application identified above is incorporated herein by reference in its entirety.

FIELD OF THE INVENTION

The invention relates to a method for removing organic coatings from substrates, the organic coating having been applied by means of ionogenic gel formation, and recycling of the substrate and also where possible of the detached coating.

BACKGROUND OF THE INVENTION

Currently, it is not financially viable, or is only feasible with difficulty, to remove the deposited varnish layer(s) of dip-coated substrate before firing. Defectively coated substrates are generally disposed of or have to be reworked in costly processes. The document DE 10 2013 201 966 A1 discloses a novel method for coating metallic surfaces and the coating systems used for this purpose, by which a dispersion of film-forming polymers and an anionic polyelectrolyte in the form of an ionogenic gel is deposited by cations dissolved out of the metallic surface. The entire content of the aforementioned document should form part of the present application. The coating systems described therein are designated, in the context of this application, as universal dip coats.

BRIEF SUMMARY OF THE INVENTION

The object of the invention is to provide a method by which the organic coating formed by ionogenic gel formation can be removed again from the substrate surface by various chemicals, optionally by a dipping or spraying process, and the substrate can be reintegrated into the process chain for a repeated coating.

DETAILED DESCRIPTION OF THE INVENTION

According to the invention the method for removing a substrate that is coated with an organic coating by means of ionogenic gel formation is carried out by treating a wet or dry organic coating that has not yet formed a film on the substrate with an aqueous solution of a metal salt from main group I in the periodic table of the elements, a complexing agent and/or a basic compound having a pH value >10.

The removal is preferably carried out using a dipping or spraying process.

An aqueous solution of at least one metal salt of the elements Li, Na and K as well as preferably Na and K is preferably used.

Alternatively, a complexing agent is used which undergoes substantial complexing with iron, zinc, magnesium and aluminum, preferably EDTA and/or polyethylenimine.

As a further alternative, aqueous solutions of NaOH, KOH and/or $NH_3$ are used as basic compounds.

The thickness of the coatings to be removed can range from a few nm to several μm. Preferably, however, the thickness of the coating to be removed ranges from 1 μm to 100 μm, particularly preferably 5 μm to 35 μm. In individual cases, such as for example a process shutdown or a contamination of the dip bath with metal ions, it is also possible to clean complete baths or blocked pipelines.

The concentration of the solution used is at least 5% w/w. However, a concentration between 10% and 70% w/w is preferably used. The range is particularly preferably between 20% and 45% w/w. The substances used can be combined in any ratios into aqueous formulations.

Particularly preferably, the removal of wet films can be carried out.

According to the invention, after the removal of the ionogenic gel coating the substrate can be used for coating again.

A pre-treatment by alkaline cleaning is preferably carried out before the substrate obtained is coated again.

Furthermore, the method according to the invention has the advantage that it enables the reconditioning of the detached coating. The resulting dispersion can be used again for ionogenic gel deposition on metallic surfaces. The recycling of the detached and dissolved coating can be assisted by concentration and/or neutralization. The resulting washing solution can be used either for reformulations or for already existing baths.

EXAMPLES

The invention is explained in greater detail below with reference to three examples without the invention being limited thereby to these examples.

Example 1

Bases
NaOH 10%
KOH 10%
$NH_3$ 15-25%

Example 2

Competing Metal Ions
KCl
NaCl
$K_2CO_3$ 10%
$Na_2CO_3$ 10%
$K_2SO_4$ 10%

Example 3

Complexing Agents
Lupasol G20 15%
Lupasol FG 15%
EDTA (ethylene diamine tetraacetate)

The substances specified in the examples are prepared in aqueous formulations in the specified percentages by weight attached. Then substrates coated with an organic coating in terms of the ionogenic gel formation are dipped into the produced solutions and if required are swiveled slightly until the coating dissolves or is detached.

The invention claimed is:
1. A method for removing an ionogenic gel coating from a substrate, said method comprising:

providing said substrate having an ionogenic gel coating applied thereon, wherein said ionogenic gel coating is wet or dry and has not yet formed a film on said substrate;

removing said ionogenic gel coating by treating said substrate with an aqueous solution comprising:

at least one selected from the group consisting of a metal salt from main group I in the periodic table of the elements, a complexing agent, and a basic compound having a pH value >10.

2. The method according to claim 1, wherein treating the substrate is carried out by either dipping or spraying.

3. The method according to claim 1, wherein the metal salt is selected from the group consisting of Li, Na, K, and a combination of Na and K.

4. The method according to claim 1, wherein the complexing agent is selected from the group consisting of EDTA, polyethylenimine, and combinations thereof.

5. The method according to claim 1, wherein the basic compound is selected from the group consisting of aqueous solutions of NaOH, KOH and/or $NH_3$.

6. The method according to claim 1, wherein a concentration of the metal salt in the aqueous solution is between 10% and 70% w/w.

7. The method according to claim 1, wherein the ionogenic gel coating removed is a wet coating.

8. The method according to claim 1, wherein the thickness of the ionogenic gel coating is in a range of 1 μm to 100 μm.

9. The method according to claim 1, further comprising: recoating said substrate after removing the ionogenic gel coating.

10. The method according to claim 1, wherein a concentration of the metal salt in the aqueous solution is at least 5% w/w.

11. The method according to any of claims 2 to 5, wherein a concentration of the metal salt in the aqueous solution is at least 5% w/w.

12. The method according to claim 6, wherein the concentration is between 20% and 45% w/w.

13. The method according to claim 9, further comprising: pretreating said substrate prior to recoating.

14. The method according to claim 10, wherein the ionogenic gel coating removed is a wet coating.

15. The method according to claim 10, wherein the thickness of the ionogenic gel coating is in a range of 1 μm to 100 μm.

16. The method according to claim 10, further comprising: recoating said substrate after removing the ionogenic gel coating.

17. The method according to claim 16, further comprising: pretreating said substrate prior to recoating.

* * * * *